V. V. MESSER.
IRRIGATION VALVE.
APPLICATION FILED AUG. 4, 1910.
989,920.
Patented Apr. 18, 1911.
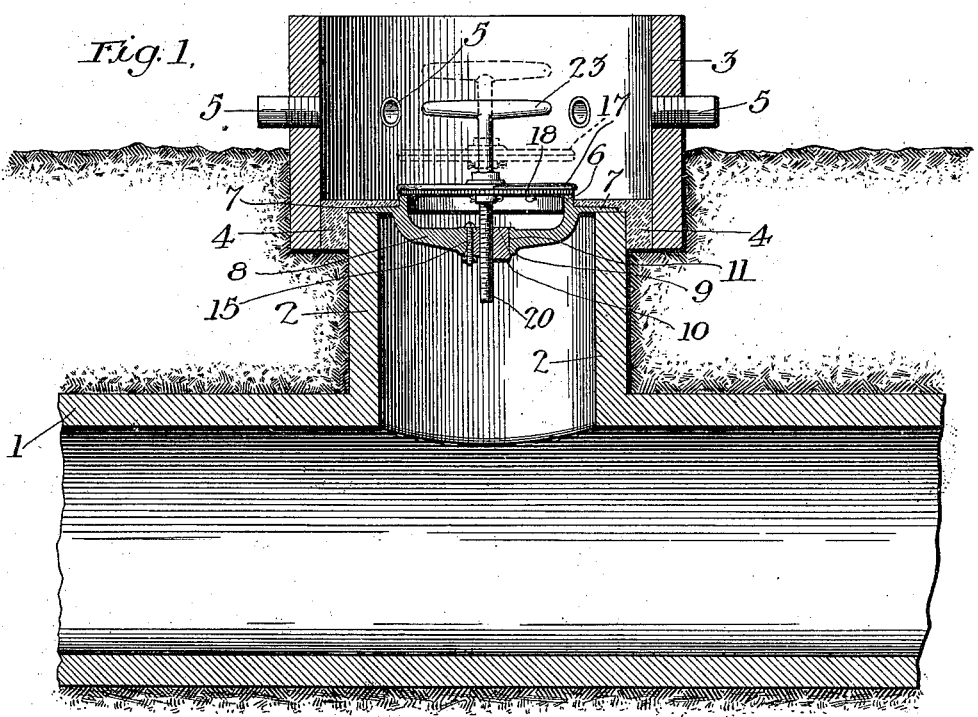
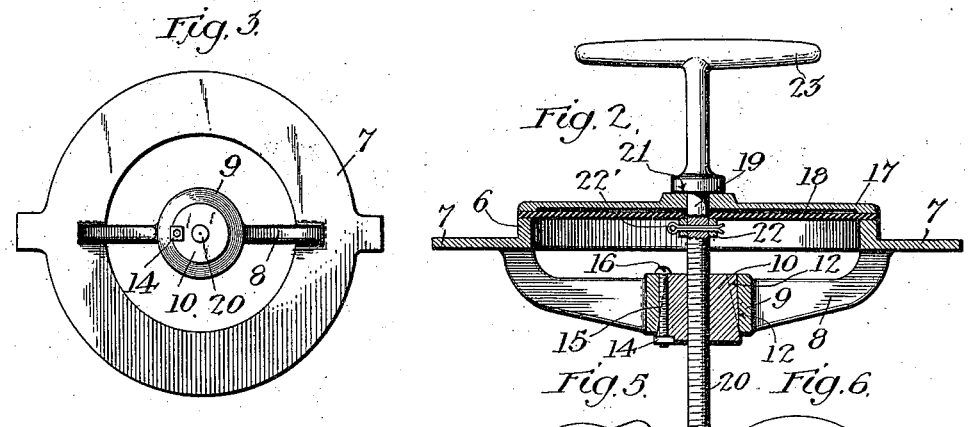
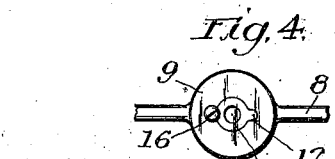

UNITED STATES PATENT OFFICE.

VLADIMIR V. MESSER, OF LOS ANGELES, CALIFORNIA, ASSIGNOR TO H. J. BRUBACHER, J. B. BRUBACHER, AND ELMER E. TEAGUE, ALL OF SAN DIMAS, CALIFORNIA.

IRRIGATION-VALVE.

989,920.

Specification of Letters Patent. Patented Apr. 18, 1911.

Application filed August 4, 1910. Serial No. 575,552.

*To all whom it may concern:*

Be it known that I, VLADIMIR V. MESSER, a citizen of the United States, residing at Los Angeles, in the county of Los Angeles and State of California, have invented a new and useful Irrigation-Valve, of which the following is a specification.

This invention relates to a valve designed for controlling the flow of water at a distributing outlet of an irrigation system, and one of the objects of the invention is to provide a valve of the character described which is of simple and economical construction and durable and effective in use.

Another object of the invention is to so construct the valve that the parts may be readily assembled to facilitate replacing the wearing parts of the device.

Other objects and advantages will appear as hereinafter brought out in the following description.

The accompanying drawings illustrate the invention.

Figure 1 is a vertical section through a part of an irrigation system at one of the outlets, showing the valve partially in elevation and in closed position. Fig. 2 is an enlarged sectional view of the valve partly in elevation. Fig. 3 is an inverted plan view of the valve. Fig. 4 is a fragmental plan view of a portion of the device. Figs. 5 and 6 are enlarged perspective views of the frusto-conical nut.

1 designates a pipe line with a vertical branch 2 located in the ground, as shown, and 3 designates a basin which encircles the branch 2 and projects above the ground. Cement 4 is placed upon the basin 3 and branch 2 to unite the same together. A series of discharge tubes 5 project laterally from the basin 3 for the purpose of discharging water to the ground to be irrigated from the basin 3, the water having been admitted to the basin 3 from the branch 2 through the valve. Resting upon the top of the branch pipe 2 is a valve which in the present form comprises a ring 6 forming a valve seat and having a flange 7 which rests upon the top of the branch pipe 2, the cement 4 extending over the flange 7 to the ring 6, thereby securing the valve firmly in place upon the top of the branch pipe 2.

Cast integrally with the ring 6 and flange 7 is a diametrical yoke 8 bowed downwardly therefrom and extending across the ring 6.

The yoke 8 is provided with a central enlargement 9 formed with a tapered round opening therethrough in which is inserted a frusto-conical nut 10 formed of brass or other noncorrosive material and provided at one side with a longitudinal lug 11 for engagement in either one of two recesses 12 in the enlargement 9 of the yoke 8 to prevent the nut 10 turning in the yoke. The opposite side of the nut 10 from the lug 11 is grooved, as shown at 13, the lower portion of the nut below the groove being cut away to receive a secondary nut 14 for the purposes hereinafter described. The nut 10 is held in vertical relation to the yoke 8 by means of a bolt or screw 15 which fits within the opening formed by the groove 13 in the nut 10 and the groove 12 in the enlargement 9 of the yoke which registers therewith. The head 16 of the screw extends over a portion of the enlargement 9 and nut 10 and engages at its lower end in the nut 14. The bolt or screw 15 also assists in preventing the nut 10 from turning in the yoke 8 together with the lug 11 of the nut engaging in the groove 12 of the enlargement 9 of the yoke.

17 designates a valve disk below which is a gasket 18 of rubber or other suitable material which is adapted to close upon a valve seat 6 and prevent passage of water therethrough. The valve disk 17 and gasket 18 are carried upon the shank 19 of an adjusting screw 20, there being a shoulder 21 formed on the shank above the valve disk 17 which acts downwardly against the valve disk when the screw is tightened to close the valve. A collar 22 is secured to the shank 19 below the gasket 18 by means of a pin 22′ to support the gasket 18 on the shank 19 when the valve is in raised position. The screw 20 takes into the non-revoluble nut 10 and is provided with a crank 23 formed upon the upper end thereof by means of which the screw is turned.

From the above description it will be seen that the nut 10 is firmly held in fixed position in the yoke 8 both from turning in the yoke and from moving longitudinally therein. It will also be understood that the yoke having similar recesses 12 at opposite sides, the nut 10 may be placed in the yoke with the lug 11 engaging in either recess and the bolt or screw 15 placed in the opposite recess. With this construction the nut 10 may be readily removed by first removing the bolt 15 and running the screw 20 free of the nut.

In Fig. 1 the valve is shown in closed position and is opened by turning the crank 23 to raise the screw in the nut 10 and elevate the valve disk 17 and gasket 18. As the valve is thus opened water under pressure rises through the ring 6 into the basin 3 from which it is distributed to the ground through the tubes 5, the valve being shown in raised position in dotted lines in Fig. 1.

What I claim is:—

1. An irrigation valve comprising a ring forming a valve seat, said ring having a diametrical yoke with a tapered vertical opening therethrough and a recess at opposite sides of said opening, a nut in said opening having a lug adapted to fit either of said recesses, an adjusting screw in said nut, a valve disk on said screw, and a gasket on said screw between said valve disk and said valve seat.

2. An irrigation valve comprising a ring forming a valve seat, said ring having a diametrical yoke with a tapered opening therethrough and a recess at opposite sides of said opening, a frusto-conical nut in said opening having a lug adapted to engage either of said recesses and a groove extending longitudinally in the opposite side of said nut registering with one of the recesses in the yoke, means engaging in the groove of the nut and the adjacent recess in the yoke to prevent longitudinal movement of said nut in said yoke, an adjusting screw in said nut, a valve disk on said screw, and a gasket on said screw between said valve disk and said valve seat.

3. An irrigation valve comprising a ring forming a valve seat, said ring having a diametrical yoke with a tapered opening therethrough and a recess at the opposite sides of said opening, a frusto-conical nut in said opening having a lug adapted to engage either of said recesses in the yoke and a groove extending longitudinally in said nut in the opposite side of said nut registering with one of the recesses in the yoke, thereby forming an opening, a bolt extending through said opening, the head on said bolt extending over the adjacent portion of the nut and yoke, means in the nut for engaging said bolt, an adjusting screw in said nut, a valve disk on said screw, and a gasket on said screw between said valve disk and said valve seat.

In testimony whereof, I have hereunto set my hand at Los Angeles, California, this 29 day of July 1910.

VLADIMIR V. MESSER.

In presence of—
G. T. HACKLEY,
FRANK L. A. GRAHAM.

---

Copies of this patent may be obtained for five cents each, by addressing the "Commissioner of Patents, Washington, D. C."